(12) United States Patent
Wang et al.

(10) Patent No.: US 12,117,669 B2
(45) Date of Patent: Oct. 15, 2024

(54) OPTICAL IMAGING LENS ASSEMBLY

(71) Applicant: Zhejiang Sunny Optics Co., Ltd., Zhejiang (CN)

(72) Inventors: Jian Wang, Zhejiang (CN); Lingbo He, Zhejiang (CN); Jianjun Li, Zhejiang (CN); Fujian Dai, Zhejiang (CN); Liefeng Zhao, Zhejiang (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 162 days.

(21) Appl. No.: 17/242,238

(22) Filed: Apr. 27, 2021

(65) Prior Publication Data

US 2021/0333508 A1 Oct. 28, 2021

(30) Foreign Application Priority Data

Apr. 28, 2020 (CN) .......................... 202010349038.5

(51) Int. Cl.
| | | |
|---|---|---|
| *G02B 9/34* | (2006.01) | |
| *G02B 3/04* | (2006.01) | |
| *G02B 13/00* | (2006.01) | |
| *G02B 27/00* | (2006.01) | |

(52) U.S. Cl.
CPC ................. *G02B 9/34* (2013.01); *G02B 3/04* (2013.01); *G02B 13/004* (2013.01); *G02B 27/0025* (2013.01)

(58) Field of Classification Search
CPC ........ G02B 9/34; G02B 3/04; G02B 27/0025; G02B 13/004; G02B 13/18
USPC ................ 359/715, 714, 763, 773, 774, 780
See application file for complete search history.

(56) References Cited

U.S. PATENT DOCUMENTS

| | | | | |
|---|---|---|---|---|
| 4,969,721 A | 11/1990 | Mihara | | |
| 2004/0136086 A1 | 7/2004 | Ohtake | | |
| 2012/0236421 A1* | 9/2012 | Tsai | ...................... | G02B 13/004 359/780 |
| 2012/0281299 A1* | 11/2012 | Hsu | ....................... | G02B 13/004 359/715 |
| 2014/0146401 A1* | 5/2014 | Tsai | ...................... | G02B 13/004 359/715 |

(Continued)

FOREIGN PATENT DOCUMENTS

| | | |
|---|---|---|
| CN | 102681149 A | 9/2012 |
| CN | 103217784 A | 7/2013 |
| CN | 207473174 U | 6/2018 |

(Continued)

OTHER PUBLICATIONS

Gross, Handbook of Optical Systems Optimization, 2007, Wiley, vol. 3, pp. 377-379 (Year: 2007).*
Machine translation of WO 2021/124608 retrieved electronically from Espacenet Jul. 28, 2023 (Year: 2023).*
Field of View and Angular Field of View, 2020, pp. 1-8 [online], [retrieved Apr. 10, 2023], retrieved from the Internet <URL: https://web.archive.org/web/20200926085916https:princetoneinstruments.com/learn/camera-fundamentals/field-of-view-and-angular-field-of-view>. (Year: 2020).*

(Continued)

*Primary Examiner* — Cara E Rakowski
(74) *Attorney, Agent, or Firm* — Reising Ethington P.C.

(57) ABSTRACT

An optical imaging lens assembly including, sequentially from an object side to an image side along an optical axis, a first lens, a second lens, a third lens and a fourth lens. Each of the first lens to the fourth lens has refractive power. A total effective focal length f of the optical imaging lens assembly and an effective focal length f1 of the first lens satisfy: $2.0<f1/f<6.5$. A center thickness CT3 of the third lens along the optical axis and an edge thickness ET3 of the third lens satisfy: $2.5<CT3/ET3<4.0$.

21 Claims, 6 Drawing Sheets

(56) References Cited

U.S. PATENT DOCUMENTS

2016/0195694 A1* 7/2016 Tang ................. G02B 13/0045
                                                          359/714
2017/0219799 A1* 8/2017 Hsueh ................. G02B 13/004

FOREIGN PATENT DOCUMENTS

| CN | 212009124 U | | 11/2020 | | |
|---|---|---|---|---|---|
| CN | 112230391 A | * | 1/2021 | ........... | G02B 13/004 |
| JP | 2005292559 A | | 10/2005 | | |
| JP | 2006293324 A | | 10/2006 | | |
| JP | 2013092584 A | | 5/2013 | | |
| WO | WO-2021142608 A1 | * | 7/2021 | | |

OTHER PUBLICATIONS

"An In-depth Look at Spherical Aberration Compensation Plates" retrieved electronically from Edmunds Optics Apr. 2, 2024 (Year: 2024).*

Machine translation of CN-112230391-A retrieved electronically from PE2E Search May 7, 2024 (Year: 2024).*

First Examination Report corresponding to IN Application No. 202114016067, dated Apr. 6, 2022, 5 pages.

Chinese Office Action corresponding to application 202010349038. 5, dated Aug. 27, 2024, 6 pages.

* cited by examiner

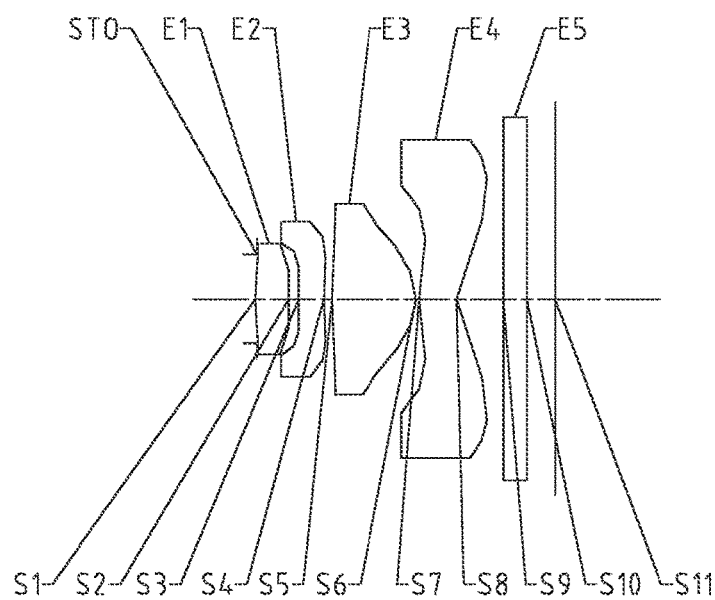
Fig. 3
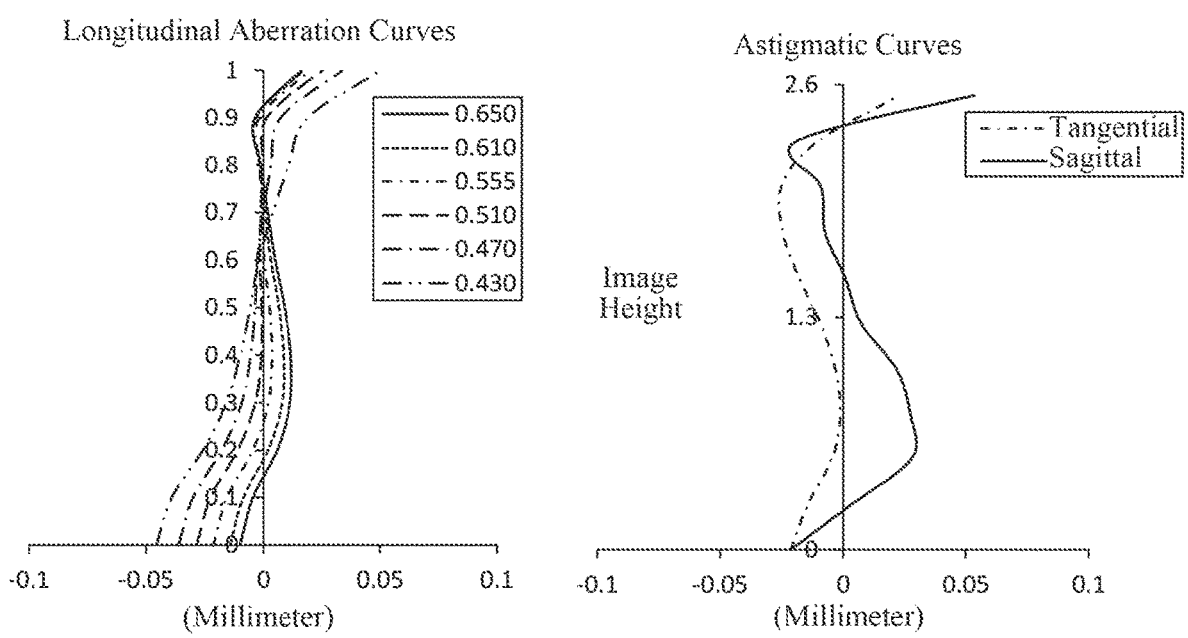
Fig. 4A                                  Fig. 4B

OPTICAL IMAGING LENS ASSEMBLY

CROSS-REFERENCE TO RELATED APPLICATION

This application claims benefit of priority to Chinese Patent Application No. 202010349038.5 filed on Apr. 28, 2020 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

As people's requirements for the camera function of portable electronic product, such as mobile phone, continue to increase, the camera function of the mobile phone is becoming more and more perfect. The camera on the mobile phone has gradually developed from the initial mono-camera to bi-camera, tri-camera, qua-camera and even pent-camera. Obviously, the camera function of the mobile phone has become one of the core competition-points of mobile phone manufacturers.

In order to meet the market's demand for the portable electronic product such as mobile phone, the imaging lens assembly mounted on the portable electronic product need to have as few lenses as possible to shorten the total length of the lens assembly. However, the design freedom will decrease as the number of lenses decreases, making it difficult for the imaging lens assembly to meet the imaging quality requirements.

SUMMARY

In one aspect, the present disclosure provides an optical imaging lens assembly which includes, sequentially from an object side to an image side along an optical axis, a first lens, a second lens, a third lens and a fourth lens. Each of the first to the fourth lenses has refractive power. A total effective focal length f of the optical imaging lens assembly and an effective focal length f1 of the first lens may satisfy: $2.0<f1/f<6.5$. A center thickness CT3 of the third lens along the optical axis and an edge thickness ET3 of the third lens may satisfy: $2.5<CT3/ET3<4.0$.

In one embodiment, at least one of an object-side surface of the first lens to an image-side surface of the fourth lens is aspheric.

In one embodiment, half of a maximum field-of-view Semi-FOV of the optical imaging lens assembly may satisfy: Semi-FOV≥45°.

In one embodiment, a maximum effective radius DT11 of an object-side surface of the first lens and a center thickness CT1 of the first lens along the optical axis may satisfy: $1.0<DT11/CT1<1.5$.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: $1.4<TTL/ImgH<2.0$.

In one embodiment, a radius of curvature R7 of an object-side surface of the fourth lens and the total effective focal length f of the optical imaging lens assembly may satisfy: $0<R7/f≤0.7$.

In one embodiment, an effective focal length f3 of the third lens and the total effective focal length f of the optical imaging lens assembly may satisfy: $0.5<f3/f<1.0$.

In one embodiment, a distance SAG32 along the optical axis from an intersection of an image-side surface of the third lens and the optical axis to a vertex of an effective radius of the image-side surface of the third lens and a radius of curvature R6 of the image-side surface of the third lens may satisfy: $0.5<SAG32/R6<1.0$.

In one embodiment, a radius of curvature R3 of an object-side surface of the second lens and a radius of curvature R4 of an image-side surface of the second lens may satisfy: $0.5<R3/R4<1.5$.

In one embodiment, a sum of the spaced intervals ΣAT along the optical axis between each two adjacent lenses of the first lens to the fourth lens may satisfy: $ΣAT≤0.65$ mm.

In one embodiment, a combined focal length f123 of the first lens, the second lens, and the third lens and the total effective focal length f of the optical imaging lens assembly may satisfy: $0.5<f123/f<1.0$.

In one embodiment, the total effective focal length f of the optical imaging lens assembly and an entrance pupil diameter EPD of the optical imaging lens assembly may satisfy: $f/EPD≤2.20$.

In one embodiment, a center thickness CT2 of the second lens along the optical axis, the center thickness CT3 of the third lens along the optical axis and a center thickness CT4 of the fourth lens along the optical axis may satisfy: $1.0<CT3/(CT2+CT4)<2.0$.

In another aspect, the present disclosure provides an optical imaging lens assembly which includes, sequentially from an object side to an image side along an optical axis, a first lens, a second lens, a third lens and a fourth lens. Each of the first to the fourth lenses has refractive power. A maximum effective radius DT11 of an object-side surface of the first lens and a center thickness CT1 of the first lens along the optical axis may satisfy: $1.0<DT11/CT1<1.5$. A distance SAG32 along the optical axis from an intersection of an image-side surface of the third lens and the optical axis to a vertex of an effective radius of the image-side surface of the third lens and a radius of curvature R6 of the image-side surface of the third lens may satisfy: $0.5<SAG32/R6<1.0$.

The present disclosure employs four lenses, and the above optical imaging lens assembly has at least one beneficial effect, such as ultra-thinness, high resolution, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 3 illustrates a schematic structural view of an optical imaging lens assembly according to example 2 of the present disclosure;

FIGS. 4A and 4B illustrate longitudinal aberration curves and astigmatic curves of the optical imaging lens assembly of the example 2, respectively;

DETAILED DESCRIPTION OF EMBODIMENTS

Figure 1:
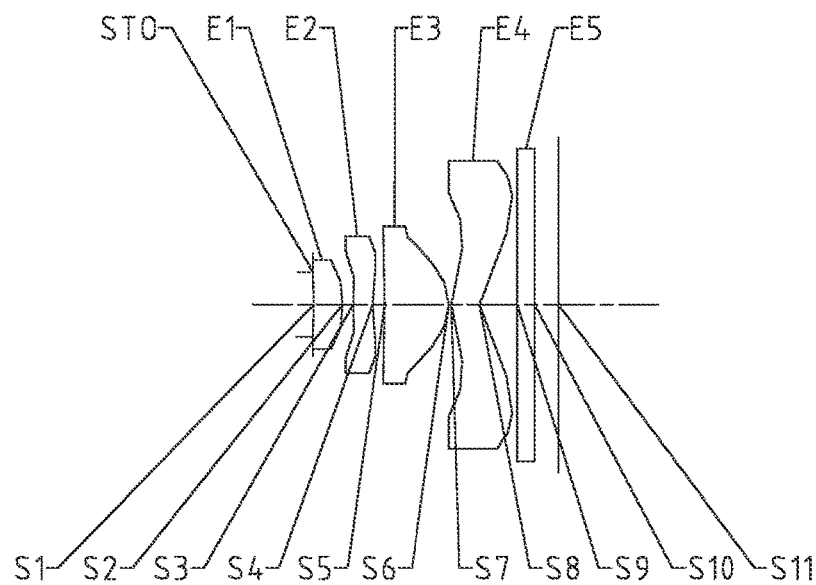
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, four lenses having refractive power, which are a first lens, a second lens, a third lens and a fourth lens. The four lenses are arranged sequentially from an object side to an image side along an optical axis. Among the first lens to the fourth lens, there may be a spaced interval between each two adjacent lenses.

In an exemplary embodiment, the first lens may have positive or negative refractive power; the second lens may have positive or negative refractive power; the third lens may have positive or negative refractive power; and the fourth lens may have positive or negative refractive power.

In an exemplary embodiment, the optical imaging lens assembly according to the present disclosure may satisfy: Semi-FOV≥45°, where Semi-FOV is half of a maximum field-of-view of the optical imaging lens assembly. More specifically, Semi-FOV may further satisfy: Semi-FOV≥49°. Satisfying Semi-FOV≥45° is beneficial to obtaining a relatively large field of view, so that the optical imaging lens assembly has a wider imaging range.

In an exemplary embodiment, the optical imaging lens assembly according to the present disclosure may satisfy: 2.0<f1/f<6.5, where f is a total effective focal length of the optical imaging lens assembly, and f1 is an effective focal length of the first lens. More specifically, f1 and f may further satisfy: 2.2<f1/f<6.5. When 2.0<f1/f<6.5 is satisfied, the first lens produces negative spherical aberration, which is then compensated with the positive spherical aberration produced by other lenses of the optical imaging lens assembly, so that the optical imaging lens assembly has good image quality.

In an exemplary embodiment, the optical imaging lens assembly according to the present disclosure may satisfy:

$1.0 < DT11/CT1 < 1.5$, where DT11 is a maximum effective radius of an object-side surface of the first lens, and CT1 is a center thickness of the first lens along the optical axis. Satisfying $1.0 < DT11/CT1 < 1.5$ may make the optical imaging lens assembly have the characteristics of a small forehead, thereby making the lens assembly of the portable electronic products such as mobile phones more beautiful.

In an exemplary embodiment, the optical imaging lens assembly according to the present disclosure may satisfy: $1.4 < TTL/ImgH < 2.0$, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: $1.4 < TTL/ImgH < 1.9$. When $1.4 < TTL/ImgH < 2.0$ is satisfied, the overall size of the lens assembly may be effectively shortened to achieve the ultra-thin characteristics of the lens group. Meanwhile, it avoids the limitation to the application of the lens assembly due to the excessive size, so that the lens group may better meet the demand.

In an exemplary embodiment, the optical imaging lens assembly according to the present disclosure may satisfy: $0 < R7/f \leq 0.7$, where R7 is a radius of curvature of an object-side surface of the fourth lens, and f is a total effective focal length of the optical imaging lens assembly. More specifically, R7 and f may further satisfy: $0.5 < R7/f \leq 0.7$. When $0 < R7/f \leq 0.7$ is satisfied, it is beneficial to avoid processing difficulties caused by the R7 being too small, and avoid that the imaging lens assembly cannot achieve a relatively large FOV due to the R7 being excessive large.

In an exemplary embodiment, the optical imaging lens assembly according to the present disclosure may satisfy: $0.5 < f3/f < 1.0$, where f3 is an effective focal length of the third lens, and f is a total effective focal length of the optical imaging lens assembly. More specifically, f3 and f may further satisfy: $0.6 < f3/f < 0.8$. Satisfying $0.5 < f3/f < 1.0$ may effectively reduce the size of the lens system. At the same time, the spherical aberration contributed by the third lens is controlled within a reasonable range, which is beneficial to the lens system to obtain better image quality.

In an exemplary embodiment, the optical imaging lens assembly according to the present disclosure may satisfy: $2.5 < CT3/ET3 < 4.0$, where CT3 is a center thickness of the third lens along the optical axis, and ET3 is an edge thickness of the third lens in a direction parallel to the optical axis. More specifically, CT3 and ET3 may further satisfy: $2.9 < CT3/ET3 < 3.7$. Satisfying $2.5 < CT3/ET3 < 4.0$ may maintain the good processability of the optical imaging lens assembly. At the same time, it is beneficial to reduce the distortion of the lens system, so as to obtain better imaging effect.

In an exemplary embodiment, the optical imaging lens assembly according to the present disclosure may satisfy: $0.5 < SAG32/R6 < 1.0$, where SAG32 is a distance along the optical axis from an intersection of an image-side surface of the third lens and the optical axis to a vertex of an effective radius of the image-side surface of the third lens, and R6 is a radius of curvature of the image-side surface of the third lens. More specifically, SAG32 and R6 may further satisfy: $0.7 < SAG32/R6 < 1.0$. When $0.5 < SAG32/R6 < 1.0$ is satisfied, it is beneficial for the system to obtain a relatively small Fno. At the same time, the processing difficulty caused by the excessive bending of the third lens is avoided.

In an exemplary embodiment, the optical imaging lens assembly according to the present disclosure may satisfy: $0.5 < R3/R4 < 1.5$, where R3 is a radius of curvature of an object-side surface of the second lens, and R4 is a radius of curvature of an image-side surface of the second lens. More specifically, R3 and R4 may further satisfy: $0.9 < R3/R4 < 1.5$. When $0.5 < R3/R4 < 1.5$ is satisfied, the shape of the second lens may be effectively restricted, and the aberration contributed by the object-side surface and the image-side surface of the second lens may be effectively controlled, so as to achieve the correction of various aberrations.

In an exemplary embodiment, the optical imaging lens assembly according to the present disclosure may satisfy: $\Sigma AT \leq 0.65$ mm, where $\Sigma AT$ is a sum of the spaced intervals along the optical axis between each two adjacent lenses of the first lens to the fourth lens. That is, $\Sigma AT$ is a sum of the spaced interval between the first lens and the second lens, the spaced interval between the second lens and the third lens, and the spaced interval between the third lens and the fourth lens. When $\Sigma AT \leq 0.65$ mm is satisfied, excessive deflection of the light may be avoided, which is beneficial to reduce the difficulty of lens processing and assembly.

In an exemplary embodiment, the optical imaging lens assembly according to the present disclosure may satisfy: $0.5 < f123/f < 1.0$, where f123 is a combined focal length of the first lens, the second lens, and the third lens, and f is a total effective focal length of the optical imaging lens assembly. More specifically, f123 and f may further satisfy: $0.6 < f123/f < 0.9$. Satisfying $0.5 < f123/f < 1.0$ may avoid the refractive power of the lens system being excessive concentrated, so that the aberrations of the lens system may be better corrected.

In an exemplary embodiment, the optical imaging lens assembly according to the present disclosure may satisfy: $f/EPD \leq 2.20$, where f is a total effective focal length of the optical imaging lens assembly, and EPD is an entrance pupil diameter of the optical imaging lens assembly. Satisfying $f/EPD \leq 2.20$ may effectively increase the amount of light through the lens assembly, so that the optical imaging lens assembly has a relatively high relative illumination to improve the image quality of the lens assembly in a darker environment.

In an exemplary embodiment, the optical imaging lens assembly according to the present disclosure may satisfy: $1.0 < CT3/(CT2+CT4) < 2.0$, where CT2 is a center thickness of the second lens along the optical axis, CT3 is a center thickness of the third lens along the optical axis, and CT4 is a center thickness of the fourth lens along the optical axis. More specifically, CT3, CT2 and CT4 may further satisfy: $1.3 < CT3/(CT2+CT4) < 1.9$. When $1.0 < CT3/(CT2+CT4) < 2.0$ is satisfied, the chromatic aberration of the optical imaging lens assembly may be better compensated. At the same time, it may avoid the processing difficulties caused by the thickness of one of the second lens, the third lens or the fourth lens being too thick, thereby making the structure distribution of the lens system more reasonable.

In an exemplary embodiment, the optical imaging lens assembly according to the present disclosure further includes a stop disposed between the object side and the first lens. Optionally, the above optical imaging lens assembly may further include an optical filter for correcting the color deviation and/or a protective glass for protecting the photosensitive element located on an imaging plane. The present disclosure proposes an optical imaging lens assembly with features, such as ultra-thin, high-definition, miniaturization, and high image quality. The optical imaging lens assembly according to the above embodiments of the present disclosure may employ a plurality of lenses, such as four lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing.

In the embodiments of the present disclosure, at least one of the surfaces of lenses is aspheric, that is, at least one of the object-side surface of the first lens to the image-side surface of the fourth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens and the fourth lens is aspheric. Optionally, the object-side surface and the image-side surface of each of the first lens, the second lens, the third lens and the fourth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking four lenses as an example, the optical imaging lens assembly is not limited to include four lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2B. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | 0.0113 | | | | |
| S1 | Aspheric | 12.0218 | 0.3400 | 1.55 | 56.1 | 3.67 | −19.6802 |
| S2 | Aspheric | −2.3768 | 0.1274 | | | | −0.2302 |
| S3 | Aspheric | 2.2578 | 0.2300 | 1.67 | 20.4 | −17.49 | −90.0000 |
| S4 | Aspheric | 1.8146 | 0.1433 | | | | −5.6492 |
| S5 | Aspheric | −2.5383 | 0.7723 | 1.55 | 56.1 | 1.25 | 5.4273 |
| S6 | Aspheric | −0.5967 | 0.0300 | | | | −0.9672 |
| S7 | Aspheric | 0.9783 | 0.3300 | 1.64 | 23.5 | −2.06 | −1.1437 |
| S8 | Aspheric | 0.4885 | 0.4505 | | | | −2.9706 |
| S9 | Spherical | Infinite | 0.2100 | 1.52 | 64.2 | | |
| S10 | Spherical | Infinite | 0.2796 | | | | |
| S11 | Spherical | Infinite | | | | | |

In this example, a total effective focal length f of the optical imaging lens assembly is 1.60 mm, a total length TTL of the optical imaging lens assembly (that is, a distance along the optical axis from the object-side surface S1 of the first lens E1 to the imaging plane S11 of the optical imaging lens assembly) is 2.91 mm, half of a diagonal length ImgH of an effective pixel area on the imaging plane S11 of the optical imaging lens assembly is 1.99 mm, and half of a maximum field-of-view Semi-FOV of the optical imaging lens assembly is 57.7°.

In example 1, the object-side surface S1 of the first lens E1 to the image-side surface S8 of the fourth lens E4 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S8 in example 1.

TABLE 2

| Surface number | A4 | A6 | A8 | A10 | A12 |
|---|---|---|---|---|---|
| S1 | −9.6468E−03 | −3.9733E−04 | −6.7023E−06 | 2.5686E−06 | 1.4748E−07 |
| S2 | −6.7844E−02 | 3.9678E−03 | −4.0090E−05 | 3.4002E−05 | 0.0000E+00 |
| S3 | −1.2596E−01 | 9.2042E−03 | 1.6879E−03 | −1.1578E−03 | −9.9911E−05 |
| S4 | −1.5763E−01 | 5.9155E−03 | −3.7620E−03 | −1.7863E−03 | −4.6201E−04 |
| S5 | 1.6765E−01 | 9.3403E−03 | 4.0136E−03 | −3.1805E−04 | −7.4632E−04 |
| S6 | 1.4680E−01 | 1.9285E−02 | 2.2374E−02 | 3.3265E−03 | 1.4310E−03 |
| S7 | −9.6995E−01 | 1.3341E−01 | −1.4441E−02 | 5.5383E−03 | −1.6218E−03 |
| S8 | −8.2284E−01 | 1.0160E−01 | −2.9286E−02 | 7.1527E−03 | −6.1766E−03 |

| Surface number | A14 | A16 | A18 | A20 |
|---|---|---|---|---|
| S1 | 1.1937E−06 | −1.8927E−06 | −1.9258E−06 | −1.9175E−06 |
| S2 | 0.0000E+00 | 0.0000E+00 | 0.0000E+00 | 0.0000E+00 |
| S3 | −2.2714E−05 | −5.0478E−05 | −2.5938E−05 | −5.9761E−06 |
| S4 | −3.8001E−04 | −7.9468E−05 | −2.3448E−05 | 8.1695E−06 |
| S5 | −2.7469E−04 | 1.4804E−04 | −2.8639E−06 | −4.3517E−05 |
| S6 | −5.3777E−04 | −4.5581E−04 | −2.9797E−04 | −5.8711E−05 |
| S7 | −2.1634E−03 | 5.0050E−05 | −2.9696E−05 | −2.8773E−05 |
| S8 | −3.1779E−03 | −1.5304E−04 | −5.3999E−04 | 4.8761E−04 |

Figures 2A, 2B:
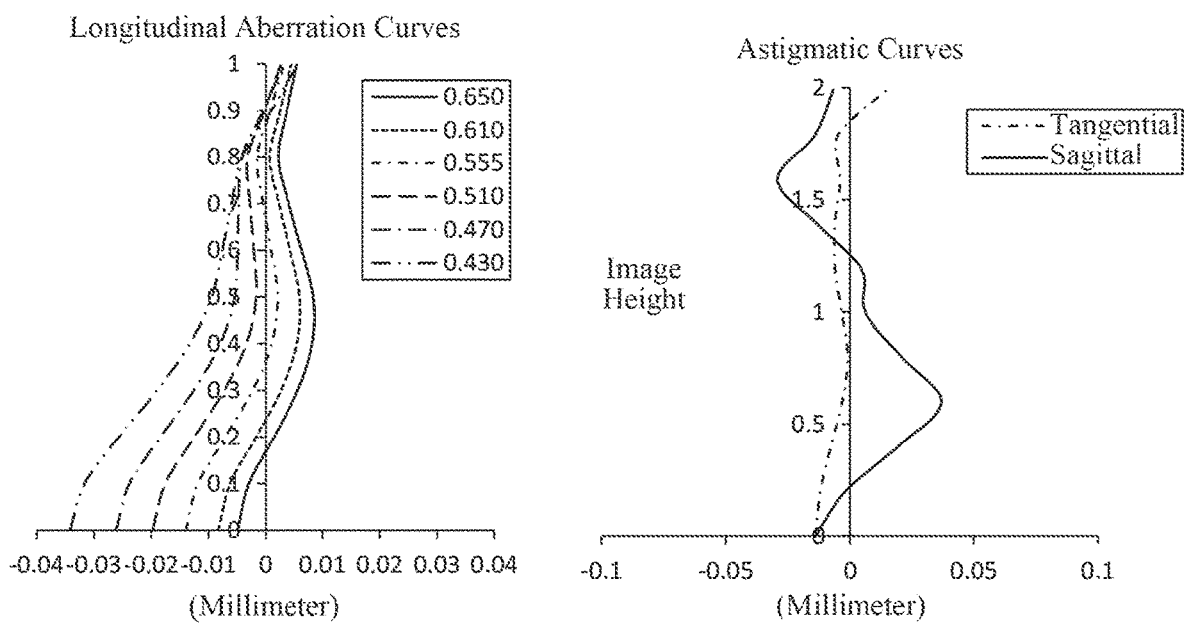
FIGS. 2A and 2B illustrate longitudinal aberration curves and astigmatic curves of the optical imaging lens assembly of the example 1, respectively.

FIG. 2A illustrates longitudinal aberration curves of the optical imaging lens assembly according to example 1, representing the deviations of focal points converged by light of different wavelengths after passing through the lens assembly. FIG. 2B illustrates astigmatic curves of the optical imaging lens assembly according to example 1, representing the curvatures of a tangential plane and the curvatures of a sagittal plane. It can be seen from FIG. 2A and FIG. 2B that the optical imaging lens assembly provided in example 1 may achieve good image quality.

Example 2

An optical imaging lens assembly according to example 2 of the present disclosure is described below with reference to FIG. 3 to FIG. 4B. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

In this example, a total effective focal length f of the optical imaging lens assembly is 2.28 mm, a total length TTL of the optical imaging lens assembly is 4.03 mm, half of a diagonal length ImgH of an effective pixel area on the imaging plane S11 of the optical imaging lens assembly is 2.54 mm, and half of a maximum field-of-view Semi-FOV of the optical imaging lens assembly is 54.7°.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | 400.0000 | | | | |
| STO | Spherical | Infinite | −0.0261 | | | | |
| S1 | Aspheric | 3.5653 | 0.4500 | 1.55 | 56.1 | 8.92 | −6.0300 |
| S2 | Aspheric | 12.7388 | 0.1291 | | | | −90.0000 |
| S3 | Aspheric | 4.8882 | 0.3375 | 1.67 | 20.4 | −61.19 | −42.1109 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | 4.2449 | 0.1147 | | | | −8.5094 |
| S5 | Aspheric | −10.8506 | 1.1273 | 1.55 | 56.1 | 1.55 | 37.1699 |
| S6 | Aspheric | −0.8114 | 0.0450 | | | | −0.9340 |
| S7 | Aspheric | 1.6049 | 0.5022 | 1.64 | 23.5 | −2.22 | −1.1984 |
| S8 | Aspheric | 0.6633 | 0.6252 | | | | −3.3793 |
| S9 | Spherical | Infinite | 0.3150 | 1.52 | 64.2 | | |
| S10 | Spherical | Infinite | 0.3873 | | | | |
| S11 | Spherical | Infinite | | | | | |

TABLE 4

| Surface number | A4 | A6 | A8 | A10 | A12 |
|---|---|---|---|---|---|
| S1 | −5.7949E−03 | −4.5478E−04 | −9.5670E−05 | −1.1034E−05 | −2.3345E−05 |
| S2 | −1.0071E−01 | −8.5803E−03 | −1.4588E−03 | −1.5949E−04 | 0.0000E+00 |
| S3 | −1.7864E−01 | −2.3457E−02 | −5.2909E−03 | −1.2367E−03 | −3.7770E−03 |
| S4 | −2.1579E−01 | −2.5567E−02 | −3.1524E−03 | −1.4397E−03 | 1.7488E−04 |
| S5 | 1.0737E−01 | −9.6431E−03 | 4.8342E−03 | −4.1220E−04 | 5.2150E−04 |
| S6 | 1.9767E−01 | 2.3617E−02 | 2.0647E−02 | 1.6380E−03 | −5.6655E−04 |
| S7 | −9.2060E−01 | 8.4795E−02 | −1.7837E−02 | 6.0006E−03 | −1.1983E−03 |
| S8 | −9.4178E−01 | 9.9016E−02 | −3.7980E−02 | 1.2231E−02 | −3.3746E−03 |

| Surface number | A14 | A16 | A18 | A20 |
|---|---|---|---|---|
| S1 | −1.0391E−05 | −1.3581E−05 | −6.0319E−06 | −6.7475E−06 |
| S2 | 0.0000E+00 | 0.0000E+00 | 0.0000E+00 | 0.0000E+00 |
| S3 | −3.2674E−05 | −3.8582E−05 | −1.5095E−05 | −2.0879E−05 |
| S4 | 6.0286E−05 | −3.5694E−05 | −2.4856E−05 | 6.9215E−06 |
| S5 | −1.0825E−04 | −4.3736E−05 | −1.6229E−05 | 2.8730E−05 |
| S6 | −1.3527E−04 | 8.0040E−05 | 1.2381E−04 | 1.0149E−06 |
| S7 | 5.0846E−04 | −6.5964E−04 | −2.4615E−04 | −2.6990E−04 |
| S8 | 2.5186E−04 | −1.3762E−03 | −5.1242E−04 | −1.5913E−04 |

FIG. 4A illustrates longitudinal aberration curves of the optical imaging lens assembly according to example 2, representing the deviations of focal points converged by light of different wavelengths after passing through the lens assembly. FIG. 4B illustrates astigmatic curves of the optical imaging lens assembly according to example 2, representing the curvatures of a tangential plane and the curvatures of a sagittal plane. It can be seen from FIG. 4A and FIG. 4B that the optical imaging lens assembly provided in example 2 may achieve good image quality.

Example 3

Figure 5:
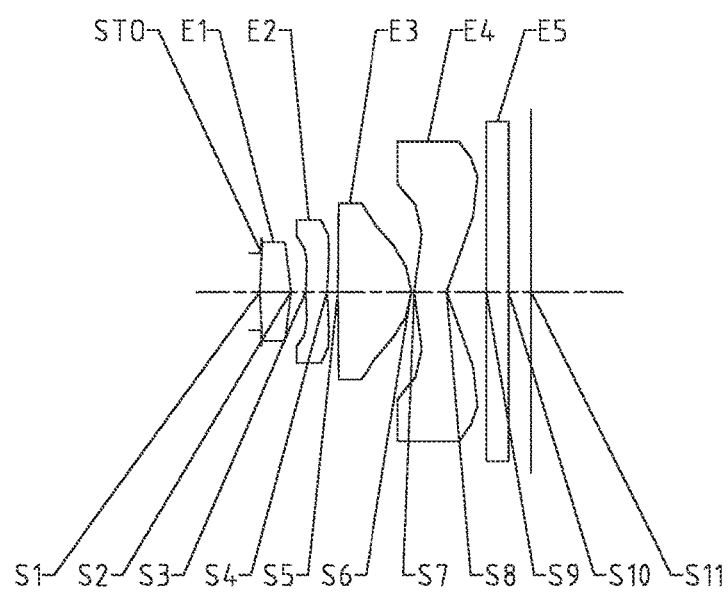
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6B. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

In this example, a total effective focal length f of the optical imaging lens assembly is 2.06 mm, a total length TTL of the optical imaging lens assembly is 3.59 mm, half of a diagonal length ImgH of an effective pixel area on the imaging plane S11 of the optical imaging lens assembly is 2.37 mm, and half of a maximum field-of-view Semi-FOV of the optical imaging lens assembly is 53.7°.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | −0.0216 | | | | |
| S1 | Aspheric | 3.1191 | 0.4147 | 1.55 | 56.1 | 5.80 | 11.3704 |
| S2 | Aspheric | 207.2000 | 0.1967 | | | | −90.0000 |
| S3 | Aspheric | 3.1920 | 0.2800 | 1.67 | 20.4 | 66.69 | −43.0159 |
| S4 | Aspheric | 3.3180 | 0.1388 | | | | −2.0933 |
| S5 | Aspheric | −4.1071 | 0.9834 | 1.55 | 56.1 | 1.49 | 6.7198 |
| S6 | Aspheric | −0.7378 | 0.0420 | | | | −0.9489 |
| S7 | Aspheric | 1.2756 | 0.4200 | 1.64 | 23.5 | −2.06 | −1.3340 |
| S8 | Aspheric | 0.5664 | 0.5282 | | | | −3.0175 |
| S9 | Spherical | Infinite | 0.2940 | 1.52 | 64.2 | | |
| S10 | Spherical | Infinite | 0.2943 | | | | |
| S11 | Spherical | Infinite | | | | | |

TABLE 6

| Surface number | A4 | A6 | A8 | A10 | A12 |
|---|---|---|---|---|---|
| S1 | −1.0832E−02 | −4.5643E−04 | −4.2432E−05 | 7.0834E−06 | −1.2673E−05 |
| S2 | −6.1937E−02 | −1.3411E−03 | 1.5837E−04 | 9.8083E−05 | 0.0000E+00 |
| S3 | −1.3595E−01 | −1.0762E−02 | 1.5877E−03 | 6.3451E−04 | 1.9148E−05 |
| S4 | −1.5241E−01 | −1.0642E−02 | 1.9250E−03 | −5.5690E−04 | −1.1988E−04 |
| S5 | 1.4169E−01 | −8.0331E−03 | 1.7996E−03 | 3.1029E−04 | 3.8363E−05 |
| S6 | 1.8042E−01 | 1.4028E−02 | 1.7877E−02 | 8.0918E−04 | 2.1263E−04 |
| S7 | −1.0870E+00 | 1.1244E−01 | −1.9674E−02 | 1.0338E−02 | −2.3093E−03 |
| S8 | −1.0778E+00 | 1.1696E−01 | −4.8774E−02 | 1.8131E−02 | −7.9999E−03 |
| Surface number | A14 | A16 | A18 | A20 | |
| S1 | −2.7764E−06 | −7.4491E−06 | −1.4842E−06 | −4.0384E−06 | |
| S2 | 0.0000E+00 | 0.0000E+00 | 0.0000E+00 | 0.0000E+00 | |
| S3 | −2.7342E−05 | −1.1491E−05 | 7.4352E−06 | −8.3276E−07 | |
| S4 | −2.5422E−05 | 3.7990E−05 | −1.1296E−06 | 4.8428E−06 | |
| S5 | −1.8697E−04 | 1.3603E−04 | −4.2682E−05 | 6.3823E−06 | |
| S6 | −6.5535E−05 | 3.0236E−05 | 4.0484E−05 | −8.0132E−06 | |
| S7 | −1.6597E−03 | −1.8806E−03 | −8.7049E−04 | −3.7892E−04 | |
| S8 | −4.9231E−04 | −2.8944E−03 | −8.6913E−04 | −4.2960E−04 | |

Figure 6A:
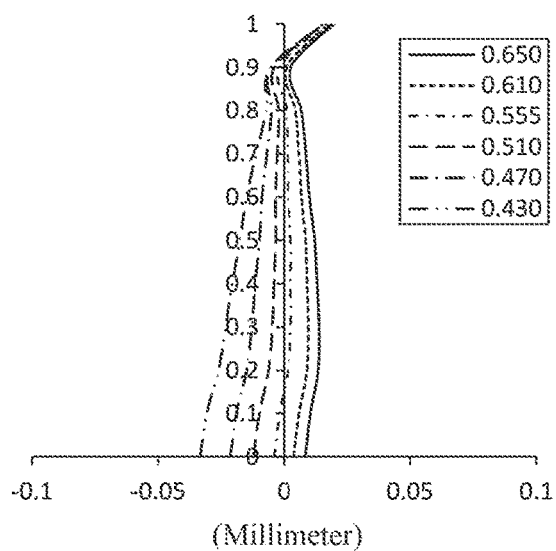
FIGS. 6A and 6B illustrate longitudinal aberration curves and astigmatic curves of the optical imaging lens assembly of the example 3, respectively.
Figure 6B:
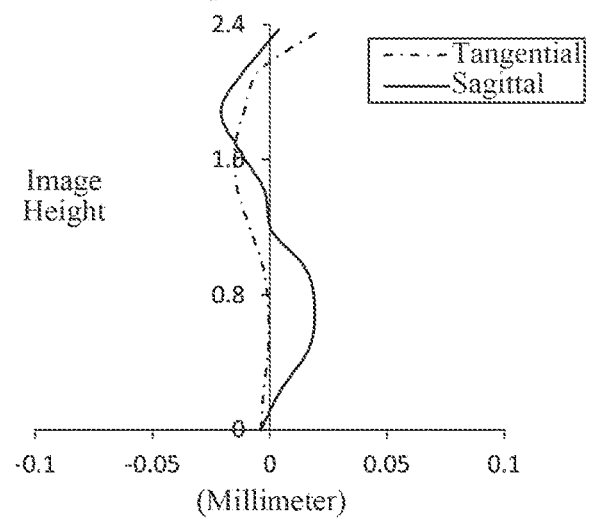

FIG. 6A illustrates longitudinal aberration curves of the optical imaging lens assembly according to example 3, representing the deviations of focal points converged by light of different wavelengths after passing through the lens assembly. FIG. 6B illustrates astigmatic curves of the optical imaging lens assembly according to example 3, representing the curvatures of a tangential plane and the curvatures of a sagittal plane. It can be seen from FIG. 6A and FIG. 6B that the optical imaging lens assembly provided in example 3 may achieve good image quality.

Example 4

Figure 7:
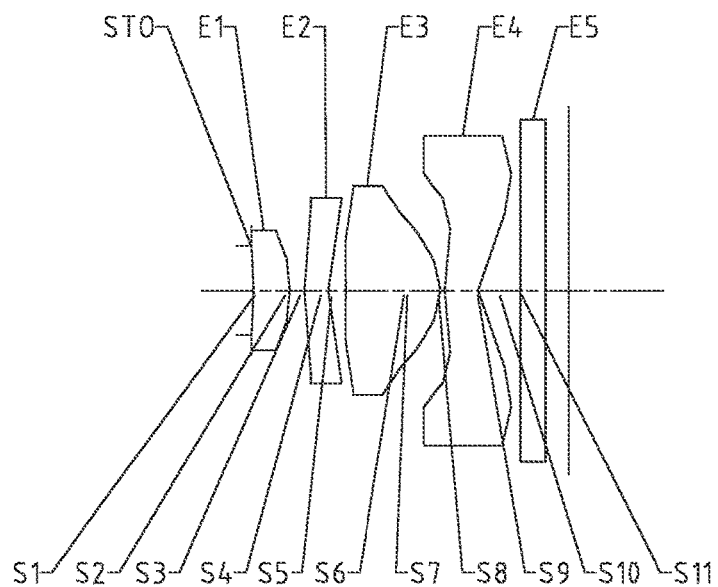
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8B. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is concave, and an image-side surface S2 thereof is convex. The second lens E2 has positive refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

In this example, a total effective focal length f of the optical imaging lens assembly is 2.39 mm, a total length TTL of the optical imaging lens assembly is 4.23 mm, half of a diagonal length ImgH of an effective pixel area on the imaging plane S11 of the optical imaging lens assembly is 2.45 mm, and half of a maximum field-of-view Semi-FOV of the optical imaging lens assembly is 50.3°.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | 0.0323 | | | | |
| S1 | Aspheric | −28.8000 | 0.4800 | 1.55 | 56.1 | 7.66 | −40.1322 |
| S2 | Aspheric | −3.6744 | 0.1982 | | | | −6.0554 |
| S3 | Aspheric | 1.6600 | 0.3222 | 1.67 | 20.4 | 23.93 | −24.9286 |
| S4 | Aspheric | 1.7088 | 0.2361 | | | | −1.2355 |
| S5 | Aspheric | −11.0413 | 1.2747 | 1.55 | 56.1 | 1.59 | 18.0637 |
| S6 | Aspheric | −0.8390 | 0.0561 | | | | −1.0112 |
| S7 | Aspheric | 1.6773 | 0.4481 | 1.64 | 23.5 | −1.91 | −1.4159 |
| S8 | Aspheric | 0.6358 | 0.5659 | | | | −3.3483 |
| S9 | Spherical | Infinite | 0.3360 | 1.52 | 64.2 | | |
| S10 | Spherical | Infinite | 0.3122 | | | | |
| S11 | Spherical | Infinite | | | | | |

TABLE 8

| Surface number | A4 | A6 | A8 | A10 | A12 |
|---|---|---|---|---|---|
| S1 | −1.7586E−02 | −4.1975E−04 | 1.9609E−05 | 5.6659E−06 | 1.9302E−06 |
| S2 | −9.8890E−02 | 8.9246E−03 | −2.1493E−04 | 2.8647E−04 | 0.0000E+00 |
| S3 | −1.0113E−01 | 1.5668E−02 | 7.1841E−03 | −4.6549E−03 | 9.4334E−04 |
| S4 | −2.4936E−01 | 1.8635E−02 | −1.5835E−03 | −1.6504E−03 | 4.7290E−04 |
| S5 | 1.6528E−01 | −6.4237E−03 | 1.5711E−03 | −3.8492E−04 | 1.2738E−04 |
| S6 | 3.1947E−01 | −1.3494E−02 | 2.8715E−02 | 4.6173E−04 | 2.4971E−03 |
| S7 | −1.1786E+00 | 1.3524E−01 | −2.4661E−02 | 1.0003E−02 | −4.4436E−04 |
| S8 | −1.1947E+00 | 1.5010E−01 | −5.9497E−02 | 1.8179E−02 | −8.8183E−03 |

| Surface number | A14 | A16 | A18 | A20 |
|---|---|---|---|---|
| S1 | 4.4125E−06 | −1.8748E−06 | −1.0081E−06 | −2.1922E−06 |
| S2 | 0.0000E+00 | 0.0000E+00 | 0.0000E+00 | 0.0000E+00 |
| S3 | −5.0863E−04 | −2.8600E−06 | −5.1122E−05 | 3.0072E−05 |
| S4 | −2.1551E−04 | −9.4720E−05 | −3.7015E−05 | −1.3480E−05 |
| S5 | −2.1182E−04 | −2.8680E−05 | −5.2916E−05 | −2.6042E−05 |
| S6 | −3.5116E−04 | 1.2519E−04 | −9.8893E−05 | 6.0550E−06 |
| S7 | −6.5964E−05 | −8.1996E−04 | −3.8367E−04 | −2.3513E−04 |
| S8 | −8.8666E−04 | −2.3956E−03 | −7.0638E−04 | −2.2697E−04 |

Figure 8A:
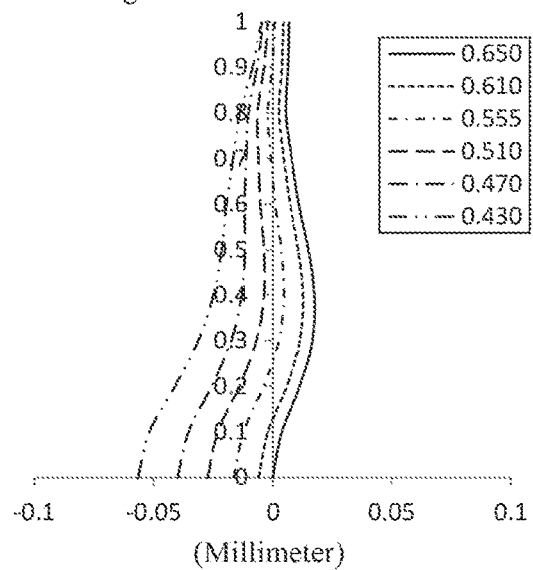
FIGS. 8A and 8B illustrate longitudinal aberration curves and astigmatic curves of the optical imaging lens assembly of the example 4, respectively.
Figure 8B:
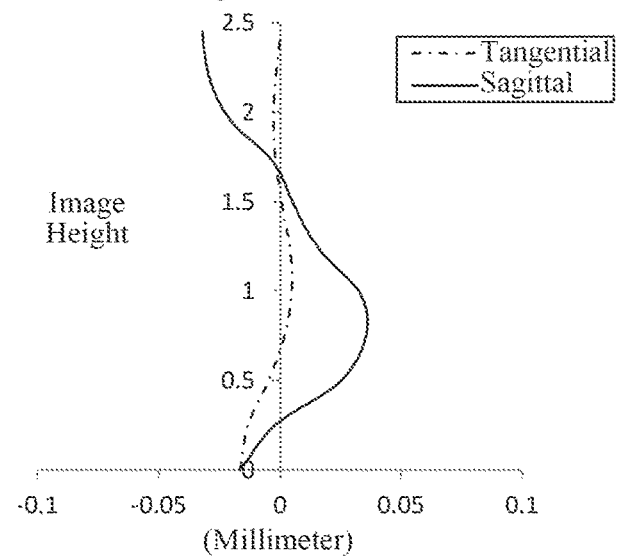

FIG. 8A illustrates longitudinal aberration curves of the optical imaging lens assembly according to example 4, representing the deviations of focal points converged by light of different wavelengths after passing through the lens assembly. FIG. 8B illustrates astigmatic curves of the optical imaging lens assembly according to example 4, representing the curvatures of a tangential plane and the curvatures of a sagittal plane. It can be seen from FIG. 8A and FIG. 8B that the optical imaging lens assembly provided in example 4 may achieve good image quality.

Example 5

Figure 9:
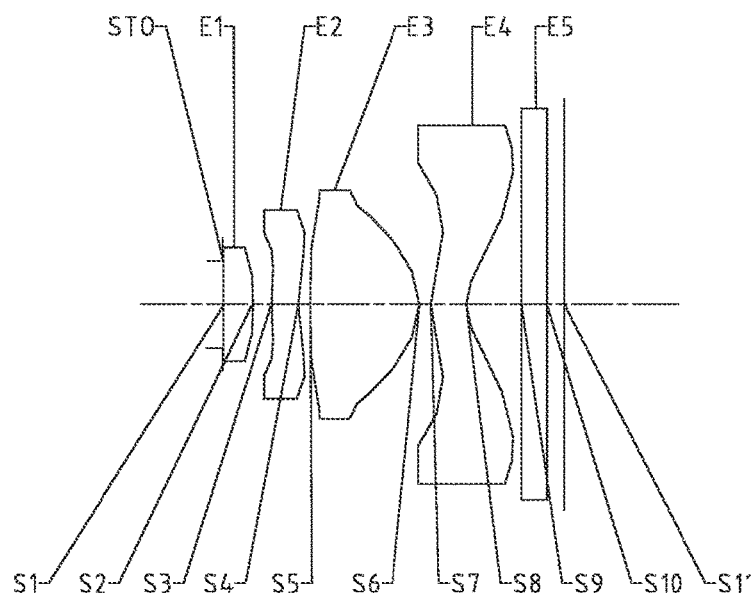
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10B. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

In this example, a total effective focal length f of the optical imaging lens assembly is 2.73 mm, a total length TTL of the optical imaging lens assembly is 5.04 mm, half of a diagonal length ImgH of an effective pixel area on the imaging plane S11 of the optical imaging lens assembly is 3.05 mm, and half of a maximum field-of-view Semi-FOV of the optical imaging lens assembly is 54.8°.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | 0.0050 | | | | |
| S1 | Aspheric | 12.4602 | 0.4382 | 1.55 | 56.1 | 10.44 | −24.6066 |
| S2 | Aspheric | −10.3718 | 0.2722 | | | | −51.4853 |
| S3 | Aspheric | 3.2344 | 0.3997 | 1.67 | 20.4 | −26.21 | −85.6312 |
| S4 | Aspheric | 2.5945 | 0.1738 | | | | −1.9856 |
| S5 | Aspheric | 36.3827 | 1.6200 | 1.55 | 56.1 | 1.96 | −80.0345 |
| S6 | Aspheric | −1.0833 | 0.1700 | | | | −0.8721 |
| S7 | Aspheric | 1.6813 | 0.5220 | 1.64 | 23.5 | −3.02 | −6.4139 |
| S8 | Aspheric | 7.0934 | 0.8129 | | | | −1.0000 |
| S9 | Spherical | Infinite | 0.3780 | 1.52 | 64.2 | | |
| S10 | Spherical | Infinite | 0.2568 | | | | |
| S11 | Spherical | Infinite | | | | | |

TABLE 10

| Surface number | A4 | A6 | A8 | A10 | A12 |
|---|---|---|---|---|---|
| S1 | −1.2928E−02 | −3.7682E−04 | −1.6131E−05 | 7.1985E−06 | −4.7298E−06 |
| S2 | −7.9651E−02 | 1.7207E−03 | 3.0885E−04 | 1.9610E−04 | 0.0000E+00 |
| S3 | −1.7868E−01 | −1.1883E−02 | 6.9913E−03 | −7.8453E−04 | −1.9662E−05 |
| S4 | −3.1742E−01 | 3.2149E−03 | −3.3969E−03 | −9.1639E−04 | −2.6297E−04 |
| S5 | 9.7132E−02 | 6.2559E−03 | 4.3255E−03 | −4.6256E−05 | −6.8769E−04 |
| S6 | 3.0738E−01 | 1.3243E−02 | 3.6447E−02 | 3.5357E−03 | 2.2455E−03 |
| S7 | −9.5293E−01 | 8.4491E−02 | 1.6238E−02 | −3.9581E−03 | 5.3492E−03 |
| S8 | −4.5206E+00 | 7.9379E−01 | −2.3556E−01 | 8.4924E−02 | −2.6840E−02 |

| Surface number | A14 | A16 | A18 | A20 |
|---|---|---|---|---|
| S1 | 1.9530E−06 | −2.4347E−06 | 1.4859E−06 | 4.4488E−08 |
| S2 | 0.0000E+00 | 0.0000E+00 | 0.0000E+00 | 0.0000E+00 |
| S3 | −3.4716E−04 | −9.5241E−05 | −8.5047E−05 | −2.1195E−05 |
| S4 | 1.1065E−05 | −1.1130E−04 | −3.9900E−05 | −2.3110E−05 |
| S5 | −2.0456E−04 | −3.8632E−05 | −9.2944E−05 | 2.3395E−05 |
| S6 | −1.0551E−03 | −6.4610E−05 | −1.5642E−04 | −4.4821E−06 |
| S7 | −3.7228E−03 | 1.8548E−03 | −7.0756E−04 | 4.8995E−04 |
| S8 | 1.1004E−02 | −4.0140E−03 | 9.3751E−04 | −3.7742E−04 |

Figure 10A:
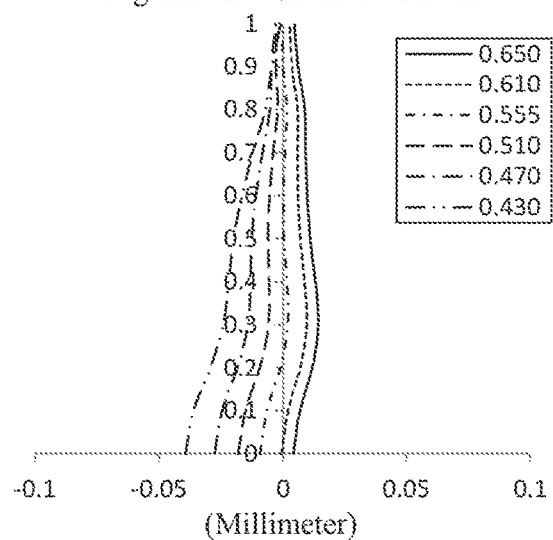
FIGS. 10A and 10B illustrate longitudinal aberration curves and astigmatic curves of the optical imaging lens assembly of the example 5, respectively.
Figure 10B:
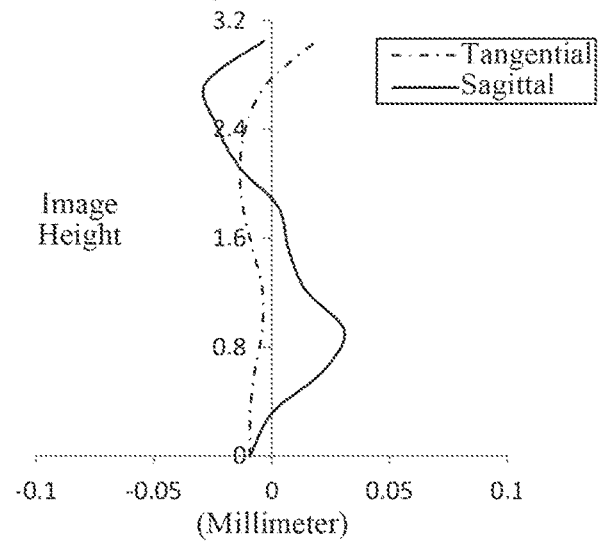

FIG. 10A illustrates longitudinal aberration curves of the optical imaging lens assembly according to example 5, representing the deviations of focal points converged by light of different wavelengths after passing through the lens assembly. FIG. 10B illustrates astigmatic curves of the optical imaging lens assembly according to example 5, representing the curvatures of a tangential plane and the curvatures of a sagittal plane. It can be seen from FIG. 10A and FIG. 10B that the optical imaging lens assembly provided in example 5 may achieve good image quality.

Example 6

Figure 11:
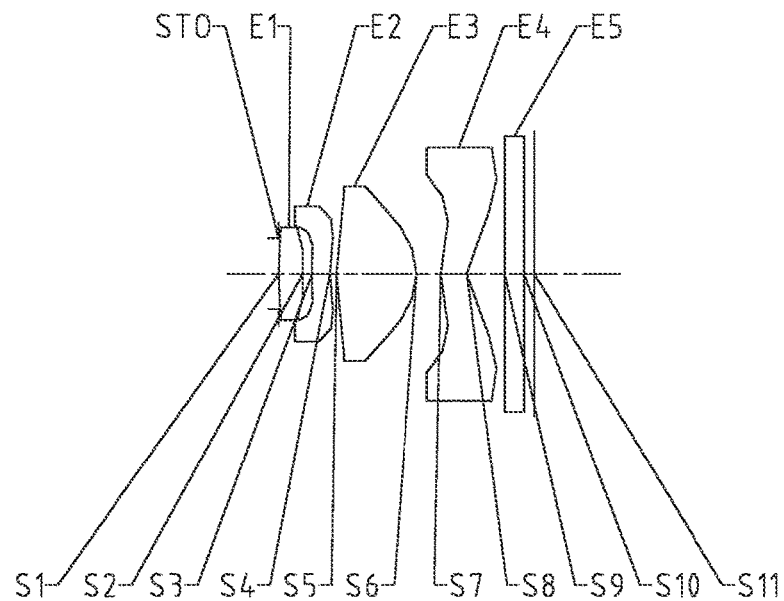
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12B. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, an optical filter E5 and an imaging plane S11, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The optical filter E5 has an object-side surface S9 and an image-side surface S10. Light from an object sequentially passes through the respective surfaces S1 to S10 and is finally imaged on the imaging plane S11.

In this example, a total effective focal length f of the optical imaging lens assembly is 1.72 mm, a total length TTL of the optical imaging lens assembly is 3.15 mm, half of a diagonal length ImgH of an effective pixel area on the imaging plane S11 of the optical imaging lens assembly is 1.69 mm, and half of a maximum field-of-view Semi-FOV of the optical imaging lens assembly is 49.9°.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 400.0000 | | | | |
| STO | Spherical | Infinite | −0.0003 | | | | |
| S1 | Aspheric | 3.3435 | 0.2953 | 1.55 | 56.1 | 11.00 | 32.3317 |
| S2 | Aspheric | 7.3091 | 0.1121 | | | | 0.2082 |
| S3 | Aspheric | 2.2345 | 0.2200 | 1.67 | 20.4 | −8.56 | −88.0618 |
| S4 | Aspheric | 1.5429 | 0.0817 | | | | −4.6637 |
| S5 | Aspheric | 4.1511 | 0.9900 | 1.55 | 56.1 | 1.32 | −87.6055 |
| S6 | Aspheric | −0.8018 | 0.2948 | | | | −0.7268 |
| S7 | Aspheric | 0.9449 | 0.3190 | 1.64 | 23.5 | −2.47 | −7.3587 |
| S8 | Aspheric | 0.5145 | 0.4705 | | | | −1.0000 |
| S9 | Spherical | Infinite | 0.2310 | 1.52 | 64.2 | | |
| S10 | Spherical | Infinite | 0.1307 | | | | |
| S11 | Spherical | Infinite | | | | | |

TABLE 12

| Surface number | A4 | A6 | A8 | A10 | A12 |
|---|---|---|---|---|---|
| S1 | −8.3962E−03 | −4.3273E−04 | −8.1568E−05 | 1.3488E−06 | −1.0364E−05 |
| S2 | −6.2359E−02 | −4.8011E−03 | −1.2519E−03 | −4.4485E−05 | 0.0000E+00 |
| S3 | −1.1944E−01 | −2.2540E−02 | −5.8288E−03 | −2.2239E−03 | −6.7478E−04 |
| S4 | −2.2462E−01 | −1.1946E−02 | −6.8134E−03 | −1.1176E−03 | −4.4667E−04 |
| S5 | 2.3906E−02 | −1.7438E−03 | 1.0302E−03 | 2.7985E−04 | 7.2779E−05 |
| S6 | 6.7669E−02 | 4.1588E−02 | 1.2852E−02 | 2.3058E−03 | −1.1897E−03 |
| S7 | −5.4558E−01 | 3.5448E−02 | 2.5268E−04 | −7.2025E−04 | 1.6625E−03 |
| S8 | −2.6261E+00 | 4.4877E−01 | −1.3491E−01 | 5.0519E−02 | −1.4870E−02 |

| Surface number | A14 | A16 | A18 | A20 |
|---|---|---|---|---|
| S1 | −3.3871E−06 | −6.6631E−06 | −3.5021E−06 | −3.9409E−06 |
| S2 | 0.0000E+00 | 0.0000E+00 | 0.0000E+00 | 0.0000E+00 |
| S3 | −2.1700E−04 | −7.3423E−05 | −2.4503E−05 | −9.2190E−06 |
| S4 | −1.6033E−05 | −5.1386E−05 | 7.6049E−06 | 6.1187E−06 |
| S5 | 8.3902E−05 | 9.5905E−06 | 1.6130E−05 | 1.5519E−05 |
| S6 | −2.6273E−04 | 7.4655E−05 | 1.3544E−04 | 3.3281E−05 |
| S7 | −9.3401E−04 | 3.7476E−04 | −2.0119E−04 | 6.3095E−05 |
| S8 | 6.5559E−03 | −2.5184E−03 | 5.7537E−04 | −3.9910E−04 |

Figures 12A, 12B:
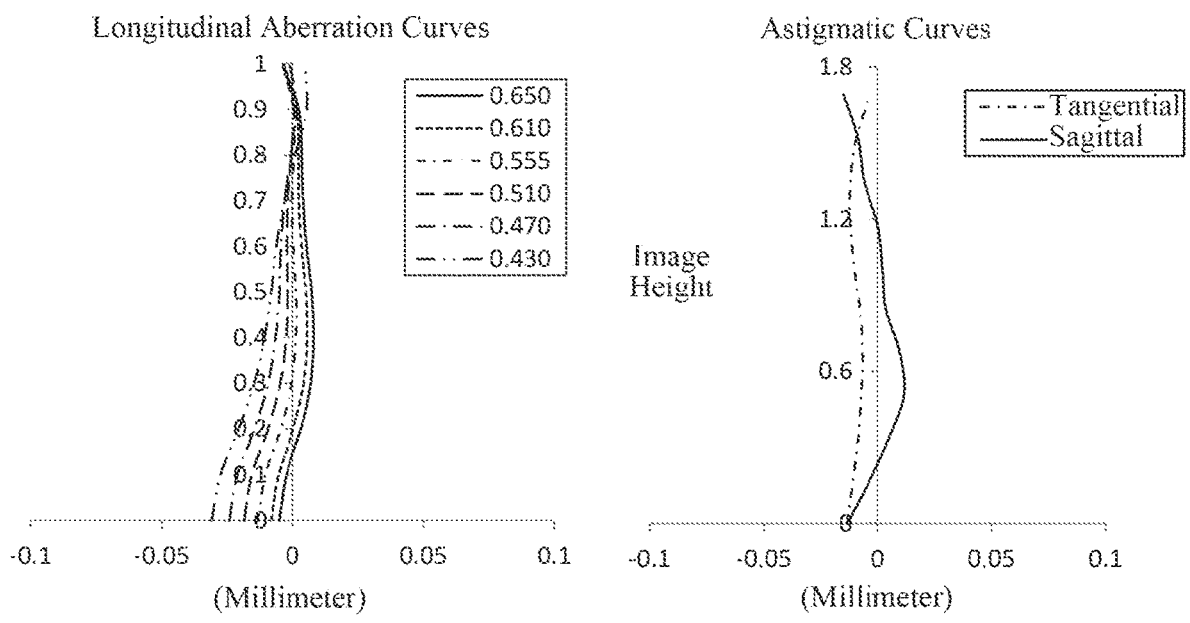
FIGS. 12A and 12B illustrate longitudinal aberration curves and astigmatic curves of the optical imaging lens assembly of the example 6, respectively.

FIG. 12A illustrates longitudinal aberration curves of the optical imaging lens assembly according to example 6, representing the deviations of focal points converged by light of different wavelengths after passing through the lens assembly. FIG. 12B illustrates astigmatic curves of the optical imaging lens assembly according to example 6, representing the curvatures of a tangential plane and the curvatures of a sagittal plane. It can be seen from FIG. 12A and FIG. 12B that the optical imaging lens assembly provided in example 6 may achieve good image quality.

In view of the above, examples 1 to 6 respectively satisfy the relationship shown in Table 13.

TABLE 13

| | Example | | | | | |
|---|---|---|---|---|---|---|
| Conditional | 1 | 2 | 3 | 4 | 5 | 6 |
| f1/f | 2.29 | 3.92 | 2.81 | 3.20 | 3.83 | 6.41 |
| DT11/CT1 | 1.09 | 1.25 | 1.18 | 1.21 | 1.45 | 1.41 |
| TTL/ImgH | 1.46 | 1.59 | 1.52 | 1.73 | 1.65 | 1.86 |
| R7/f | 0.61 | 0.70 | 0.62 | 0.70 | 0.62 | 0.55 |
| f3/f | 0.78 | 0.68 | 0.72 | 0.67 | 0.72 | 0.77 |
| CT3/ET3 | 2.99 | 3.00 | 3.20 | 3.11 | 3.64 | 3.60 |

TABLE 13-continued

| | Example | | | | | |
|---|---|---|---|---|---|---|
| Conditional | 1 | 2 | 3 | 4 | 5 | 6 |
| SAG32/R6 | 0.90 | 0.88 | 0.91 | 0.93 | 0.96 | 0.78 |
| R3/R4 | 1.24 | 1.15 | 0.96 | 0.97 | 1.25 | 1.45 |
| ΣAT (mm) | 0.30 | 0.29 | 0.38 | 0.49 | 0.62 | 0.49 |
| f123/f | 0.78 | 0.71 | 0.74 | 0.69 | 0.76 | 0.86 |
| f/EPD | 2.20 | 2.06 | 2.15 | 2.10 | 2.18 | 2.18 |
| CT3/(CT2 + CT4) | 1.38 | 1.34 | 1.40 | 1.65 | 1.76 | 1.84 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens and a fourth lens which are sequentially arranged from an object side to an image side of the optical imaging lens assembly along an optical axis, each of the first lens to the fourth lens having refractive power,
wherein the second lens and the fourth lens each have a negative refractive power,
an object-side surface of the second lens is convex at a paraxial region and an image-side surface of the second lens is concave at the paraxial region, wherein $2.29 \leq f1/f < 6.5$, Semi-$FOV \geq 45°$, $0.5 < SAG32/R6 < 1.0$, and $2.5 < CT3/ET3 < 4.0$, where f is a total effective focal length of the optical imaging lens assembly, f1 is an effective focal length of the first lens, Semi-FOV is half of a maximum field-of-view of the optical imaging lens assembly, CT3 is a center thickness of the third lens along the optical axis, ET3 is an edge thickness of the third lens in a direction parallel to the optical axis, SAG32 is a distance along the optical axis from an intersection of an image-side surface of the third lens and the optical axis to a vertex of an effective radius of the image-side surface of the third lens, and R6 is a radius of curvature of the image-side surface of the third lens,
wherein a number of lenses included in the imaging lens assembly is four.

2. The optical imaging lens assembly according to claim 1, wherein $1.0 < DT11/CT1 < 1.5$,
where DT11 is a maximum effective radius of an object-side surface of the first lens, and CT1 is a center thickness of the first lens along the optical axis.

3. The optical imaging lens assembly according to claim 1, wherein $1.4 < TTL/ImgH < 2.0$,
where TTL is a distance along the optical axis from an object-side surface of the first lens to an imaging plane of the optical imaging lens assembly, and ImgH is half of a diagonal length of an effective pixel area on the imaging plane of the optical imaging lens assembly.

4. The optical imaging lens assembly according to claim 1, wherein $0 < R7/f \leq 0.7$,
where R7 is a radius of curvature of an object-side surface of the fourth lens.

5. The optical imaging lens assembly according to claim 1, wherein $0.5 < f3/f < 1.0$,
where f3 is an effective focal length of the third lens.

6. The optical imaging lens assembly according to claim 1, wherein $0.5 < R3/R4 < 1.5$,
where R3 is a radius of curvature of an object-side surface of the second lens, and R4 is a radius of curvature of an image-side surface of the second lens.

7. The optical imaging lens assembly according to claim 1, wherein $\Sigma AT \leq 0.65$ mm,
where $\Sigma AT$ is a sum of the spaced intervals along the optical axis between each two adjacent lenses of the first lens to the fourth lens.

8. The optical imaging lens assembly according to claim 1, wherein $0.5 < f123/f < 1.0$,
where f123 is a combined focal length of the first lens.

9. The optical imaging lens assembly according to claim 1, wherein $f/EPD \leq 2.20$,
where EPD is an entrance pupil diameter of the optical imaging lens assembly.

10. The optical imaging lens assembly according to claim 1, wherein $1.0 < CT3/(CT2+CT4) < 2.0$,
where CT2 is a center thickness of the second lens along the optical axis, CT3 is the center thickness of the third lens along the optical axis, and CT4 is a center thickness of the fourth lens along the optical axis.

11. The optical imaging lens assembly according to claim 1, wherein a distance along the optical axis between the image-side surface of the second lens and an object-side surface of the third lens is equal to or less than 0.1738 mm.

12. The optical imaging lens assembly according to claim 1, wherein a central thickness of the third lens along the optical axis is greater than or equal to 0.99 mm.

13. The optical imaging lens assembly according to claim 1, wherein a value of the effective focal length f1 of the first lens is equal to or greater than 5.8 mm.

14. An optical imaging lens assembly, comprising: a first lens, a second lens, a third lens and a fourth lens which are sequentially arranged from an object side to an image side of the optical imaging lens assembly along an optical axis, each of the first lens to the fourth lens having refractive power,
wherein the second lens and the fourth lens each have a negative refractive power,
an object-side surface of the second lens is convex at a paraxial region and an image-side surface of the second lens is concave at the paraxial region, wherein $2.29 \leq f1/f < 6.5$, $1.0 < DT11/CT1 < 1.5$, Semi-$FOV \geq 45°$, and $0.5 < SAG32/R6 < 1.0$, where f is a total effective focal length of the optical imaging lens assembly, f1 is an effective focal length of the first lens, DT11 is a maximum effective radius of an object-side surface of the first lens, CT1 is a center thickness of the first lens along the optical axis, Semi-FOV is half of a maximum field-of-view of the optical imaging lens assembly, SAG32 is a distance along the optical axis from an intersection of an image-side surface of the third lens and the optical axis to a vertex of an effective radius of the image-side surface of the third lens, and R6 is a radius of curvature of the image-side surface of the third lens,
wherein a number of lenses included in the imaging lens assembly is four.

15. The optical imaging lens assembly according to claim 14, wherein $1.4 < TTL/ImgH < 2.0$,
where TTL is a distance along the optical axis from the object-side surface of the first lens to an imaging plane of the optical imaging lens assembly, and ImgH is half of a diagonal length of an effective pixel area on the imaging plane of the optical imaging lens assembly.

16. The optical imaging lens assembly according to claim 14, wherein $0<R7/f\leq0.7$,
where R7 is a radius of curvature of an object-side surface of the fourth lens.

17. The optical imaging lens assembly according to claim 14, wherein $0.5<f3/f<1.0$,
where f3 is an effective focal length of the third lens.

18. The optical imaging lens assembly according to claim 14, wherein $0.5<R3/R4<1.5$,
where R3 is a radius of curvature of an object-side surface of the second lens, and R4 is a radius of curvature of an image-side surface of the second lens.

19. The optical imaging lens assembly according to claim 14, wherein $\Sigma AT\leq0.65$ mm,
where $\Sigma AT$ is a sum of the spaced intervals along the optical axis between each two adjacent lenses of the first lens to the fourth lens.

20. The optical imaging lens assembly according to claim 14, wherein $0.5<f123/f<1.0$,
where f123 is a combined focal length of the first lens, the second lens.

21. The optical imaging lens assembly according to claim 14, wherein a distance along the optical axis between the image-side surface of the second lens and an object-side surface of the third lens is equal to or less than 0.1738 mm.

* * * * *